United States Patent [19]

Brown

[11] 4,400,905
[45] Aug. 30, 1983

[54] DECORATIVE ROACH TRAP

[76] Inventor: Harold Brown, P.O. Box 2663, Washington, D.C. 20013

[21] Appl. No.: 311,780

[22] Filed: Oct. 15, 1981

[51] Int. Cl.[3] .............................................. A01M 1/20
[52] U.S. Cl. ..................................... 43/132.1; 43/121
[58] Field of Search ............. 43/107, 121, 131, 132.1, 43/114; D22/19; 40/152, 152.1, 490, 491

[56] References Cited

U.S. PATENT DOCUMENTS

| | | | |
|---|---|---|---|
| D. 243,765 | 3/1977 | Nakai | D22/19 |
| 820,341 | 5/1906 | Bedford | 43/131 |
| 1,143,729 | 6/1915 | Schmidt | 43/131 X |
| 1,186,178 | 6/1916 | French | 43/131 |
| 2,157,449 | 5/1939 | Berg | 43/131 |
| 2,820,310 | 1/1958 | John | 40/152 |

Primary Examiner—Nicholas P. Godici
Assistant Examiner—Charles L. Willis
Attorney, Agent, or Firm—Fulwider, Patton, Rieber, Lee & Utecht

[57] ABSTRACT

A decorative roach trap including a rectangularly shaped hollow housing having the front wall thereof formed with a window behind which is removably mounted a decorative insert displaying a selected scene. The housing is formed in one end with a transversely extending slot into which is inserted a poisonous card impregnated with roach poison. The walls of the housing are formed with roach entry doors and the back of the housing is formed with adhesive pads for suspending the housing from a room wall to thus present a decorative appearance while concealing the true purpose of the roach trap.

10 Claims, 6 Drawing Figures

DECORATIVE ROACH TRAP

BACKGROUND OF THE INVENTION

1. Field of the Invention

The present invention relates to poisonous roach traps.

2. Description of the Prior Art

Numerous different styles of roach traps have been proposed and typical characteristics of such traps are hollow boxes containing poisonous substances and having roach entry doors in the walls thereof. Such traps are readily recognizable when viewed by a guest and present a generally unappealing appearance to the viewer. Furthermore, many roach traps heretofore in use incorporate the poisonous material in the housing of the trap itself, thus necessitating discard of the entire trap once the poison has lost its effect.

No roach traps are known to applicant which display decorative panels for concealing the true purpose of such trap. Picture frames have been proposed with removable picture panels but none are known to applicant which incorporate poisonous insert cards and roach entry doors.

SUMMARY OF THE INVENTION

The roach trap of the present invention is characterized by a hollow housing formed with one wall in the form of an exteriorly facing decorative panel and the opposite wall thereof including a suspension or support element. The housing is formed in one end with a slot for receiving a poisonous insert and is formed along its opposite edges with roach entry doors.

These and other features of the invention will become apparent from a consideration of the following detailed description of the drawings.

DESCRIPTION OF THE PREFERRED EMBODIMENT

Figure 1:
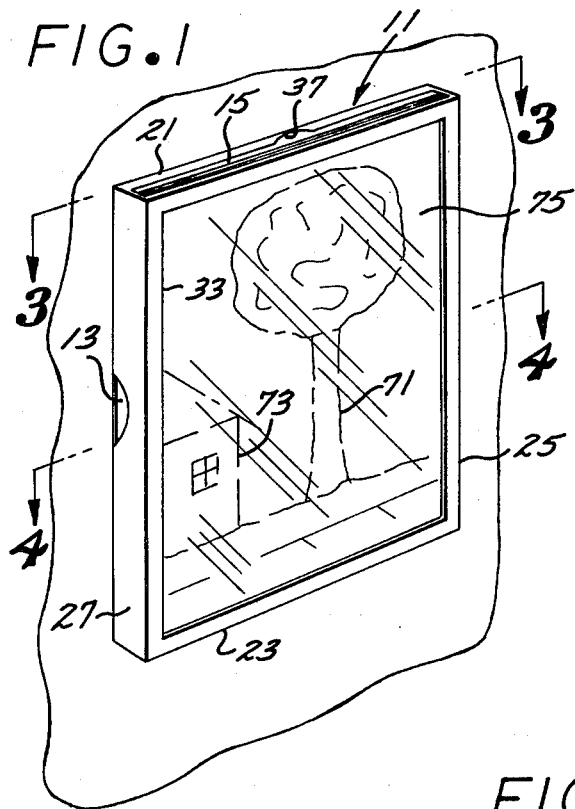
FIG. 1 is a perspective view of a decorative roach trap embodying the present invention.
Figure 2:
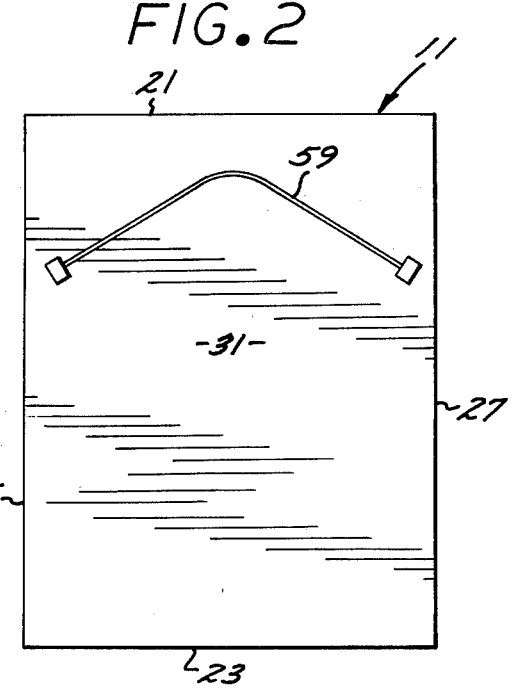
FIG. 2 is a back view, in enlarged scale, of the roach trap shown in FIG. 1.
Figure 3:
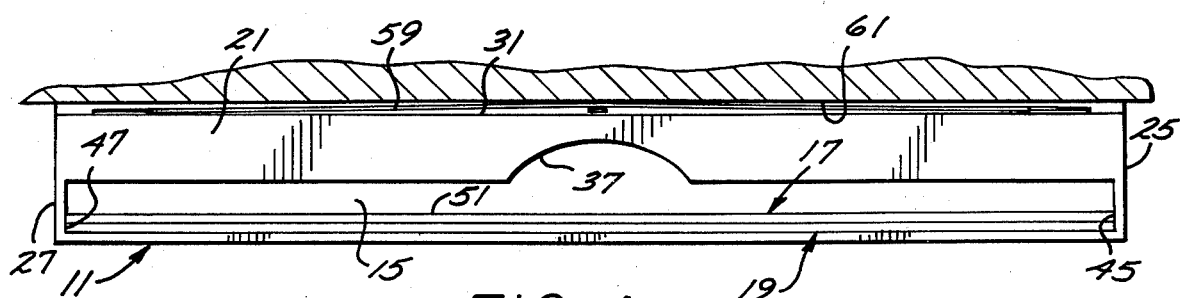
FIG. 3 is a transverse sectional view, in enlarged scale, taken along the line 3—3 of FIG. 1.
Figure 4:
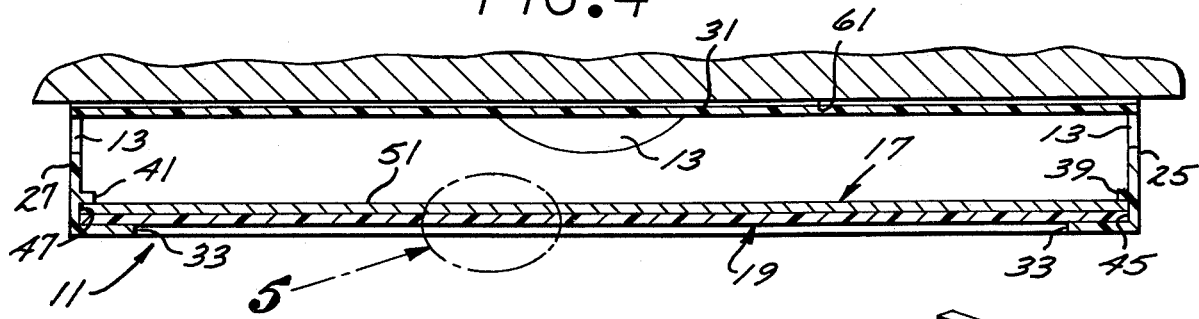
FIG. 4 is a transverse sectional view, in enlarged scale, taken along the line 4—4 of FIG. 1.

Referring to FIGS. 1, 3 and 4, generally, the decorative roach trap of the present invention is in the form of a rectangularly shaped container 11 formed with a hollow interior and having its side, top and bottom walls formed with respective roach doors 13. The top wall is formed with a transversely elongated slot 15 for slidable receipt thereinto of a poisonous insert card 17, to overlie a decorative picture panel 19. Thus, the trap 11 may be supported in an upright position to display the decorative picture panel 19 and roaches entering the interior of the trap through the doorways 13 will be exposed to the poisonous insert panel 17 to thus be exterminated.

The trap container 11 may take many different forms but in the preferred embodiment is shown as a rectangular hollow container defined by a picture frame having respective top, bottom, and right and left hand sidewalls 21, 23, 25 and 27. The container 11 is formed with a back wall 31 and is formed on its front side with a marginal border 33 (FIG. 1).

Referring to FIGS. 3 and 4, the top wall 21 is formed with the transverse slot 15, such slot being formed intermediately with a semicircular cutout forming a combination finger hole and roach doorway 37. The slot 15 is of sufficient width to accommodate passage therethrough of the panel 19 and card 17, with such card carrying on the face thereof roaches killed by the poisonous effects thereof. It will be appreciated that from time to time the user may invert the trap over a track container to shake dead roaches out through such slot 15.

Referring to FIG. 4, the opposite sidewalls 25 and 27 are formed with respective vertical rails 39 and 41 spaced inwardly from the vertical runs of the front border 33 to cooperate therewith in forming respective vertical tracks 45 and 47 defining a pocket for slidable receipt downwardly thereinto of the respective poisonous insert card 17 and overlying picture panel 19.

Figure 5:
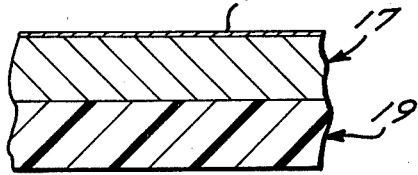
FIG. 5 is an enlarged detail view, taken from the area designated 5 in FIG. 4; and, FIG. 6 is a perspective view of a second embodiment of the decorative roach trap of the present invention.

Referring to FIG. 5, in the embodiment shown, the poisonous card 17 and picture panel 19 are disposed in intimate contact with one another, the poisonous card 17 having formed on the interior face thereof, a poisonous layer 51.

In the embodiment of the decorative trap shown in FIG. 1, the container 11 is constructed to be suspended from the wall of the user's residence or, if desired, supported on an underlying support surface such as a table. To this end, the back wall 31 has mounted thereon a suspension string 59 suspending the trap from a nail or a hook on a user's wall 61 as shown in FIG. 3.

In operation, the decorative roach trap of the present invention is normally marketed with a decorative panel 19 which may include a decorative scene as shown in FIG. 1 with a tree 71 and a house 73 displaying the desired decoration. In the embodiment shown in FIG. 1, the decorative panel 19 is shown as being covered with a transparent window 75 mounted within the confines of the marginal border 33. The trap may also be marketed with a selected set of poisonous insert cards 17 so that a spent card in the tracks 45 and 47 may be replaced from time to time to thus enable convenient replacement of a spent card which may well be covered with exterminated roaches. When the decorative roach trap of the embodiment shown in FIGS. 1 through 5 is mounted on the wall 61 as shown in FIGS. 1 and 3, the roach doorways 13 located in the sidewalls 25 and 27 and bottom wall 23, being located flush with the back wall 31 will be accessible for easy entry thereinto of roaches moving along such wall for intimate contact with the poisonous layer 51 on the insert 17 (FIG. 5).

After some period of use, the poisonous insert card 17 may become partially or fully covered with dead roaches and may become ineffective. When such insert card is then to be removed, the user need merely insert the tip of his finger in the combination finger access and roach doorway opening 37 to grasp the upper edge of the insert card centrally to withdraw same for discard. The replacement card may then be conveniently inserted by fitting the bottom edge thereof into the tracks 45 and 47 behind the rails 39 and 41 and sliding such replacement card downwardly into position behind the decorative panel 19.

It will be appreciated that from time to time the user may want to change the scene displayed in the panel 19 and, to this end, he need merely grasp the upper edge of the display panel 19 in a manner to that previously described with respect to the poisonous insert card 17 to withdraw such display panel upwardly in the tracks 45 and 47 for replacement thereof by a different selected card.

Figure 6:
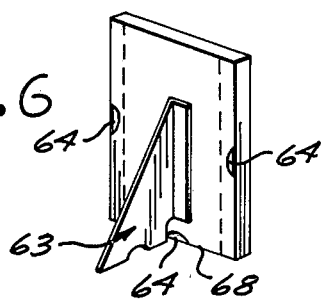

In the alternative arrangement shown in FIG. 6, a support tongue, generally designated 63, may be pivoted outwardly to project laterally of the back wall 31 for cooperating with the bottom wall 23 of the container 11 to support the container itself and a position generally angling upwardly and rearwardly from such bottom wall. In this embodiment, the roach door openings 64 may be formed in the back wall along the edges thereof. The poisonous insert card 51 is sufficiently narrow to maintain the edge thereof clear of the side doorway openings 64 for passage therethrough of roaches.

For the decorative roach trap shown in FIG. 6, the roaches traveling along the surface on which such trap is mounted will naturally crawl into the doorways 64 located in the back wall along the bottom and side edges of such roach trap, it being appreciated that the insert 66 of that roach trap is sufficiently narrow to provide clearance for travel therepast at the edges of roaches entering the side doorways 64 and the cutouts 68 in the bottom of such insert 66 providing space for passage therethrough of roaches entering the bottom doorway 64.

From the foregoing, it will be appreciated that the decorative roach trap of the present invention provides an economical and convenient means for trapping and poisoning roaches while concealing the true purpose of such trap from the casual viewer. The poisonous insert card may conveniently be replaced from time to time thus avoiding the prohibitive cost of replacing the entire trap when such card becomes spent. Likewise, the decorative scene displayed in such trap may be changed from time to time to attain a variety of views.

I claim:

1. A decorative roach trap comprising:
   a housing formed with a roach receiving compartment having side, front and back walls and terminating at one end in a slot;
   a window in said front wall;
   a poisonous insert received in said compartment;
   at least one doorway in one wall of said housing for entry into said compartment of roaches;
   a decorative panel facing outwardly for viewing through said window and arranged to be viewed by an observer when said housing is in an upright position;
   panel retaining means for retaining said panel on said housing for viewing from said window; and,
   support means on said housing for supporting it in said upright position for viewing of said decorative panel and entry into said doorway of roaches.
2. A roach trap as set forth in claim 1 wherein:
   said insert is loosely received in said slot for periodic replacement thereof.
3. A roach trap as set forth in claim 1 wherein:
   said housing is further formed with a pocket open at one end for releasably receiving said decorative panel.
4. A roach trap as set forth in claim 1 wherein:
   said support means is in the form of suspension means for suspending said housing in an upright position from a room wall.
5. A roach trap as set forth in claim 1 wherein:
   said support means is in the form of a laterally projecting flap arranged to cooperate with one end of said housing to support said housing in said upright position on an underlying support surface.
6. A roach trap as set forth in claim 1 wherein:
   said doorway is formed in and disposed at an edge of one of said sidewalls.
7. A roach trap as set forth in claim 1 wherein:
   said housing is formed with said front wall defining a border for said window.
8. A roach trap as set forth in claim 1 wherein:
   said housing is generally rectangular in shape and is formed at said one end with said slot being of sufficient width to receive both said decorative panel and said poisonous insert.
9. A roach trap as set forth in claim 1 wherein:
   said housing is rectangularly shaped and said slot is transversely elongated; and,
   said insert is rectangularly shaped.
10. A roach trap as set forth in claim 3 wherein:
    said housing is formed with rails spaced from said front wall and cooperating therewith to form tracks for receipt thereto of the opposite marginal edges of said panel and insert.

* * * * *